Dec. 15, 1931.  J. VAN ACKEREN  1,836,207
COKING RETORT OVEN
Filed Jan. 5, 1927  2 Sheets-Sheet 1

INVENTOR
Joseph van Ackeren.
BY
Jesse R. Langley
ATTORNEY

Dec. 15, 1931.  J. VAN ACKEREN  1,836,207
COKING RETORT OVEN
Filed Jan. 5, 1927  2 Sheets-Sheet 2

INVENTOR
Joseph van Ackeren.
BY
Jesse R. Langley
ATTORNEY

Patented Dec. 15, 1931

1,836,207

UNITED STATES PATENT OFFICE

JOSEPH VAN ACKEREN, OF PITTSBURGH, PENNSYLVANIA, ASSIGNOR TO THE KOPPERS COMPANY, A CORPORATION OF PENNSYLVANIA

COKING RETORT OVEN

Application filed January 5, 1927. Serial No. 159,027.

My invention relates to coking retort ovens and particularly to coking retort ovens of the continuous type and their associated apparatus.

One object of my invention is to provide simple and efficient means for effecting economical operation of a coke oven battery and an associated gas producer.

A second object of my invention is to provide means whereby waste heat from a coke oven may be utilized in the production of gas in a gas producer, with a resultant saving in fuel for the latter.

A further object of my invention is to provide means whereby waste heat from a gas producer may be utilized in the operation of a coke oven.

A still further object of my invention is to provide means whereby a coke oven and a gas producer may be co-operatively associated in such manner as to effect an interchange of waste heat therebetween and thereby increase the efficiency of the associated apparatus.

In the operation of coke ovens employing producer gas as a fuel for heating the ovens, it is desirable to locate the producer adjacent to the coke-oven battery. As is well known, there is considerable waste heat incident to the operation, both of a coke-oven battery and of a gas producer. Numerous ways have been devised in order to effect economy in the operation of coke ovens because the costs of production of the various products are dependent, to a certain degree, upon the efficiency of operation of the apparatus.

In a gas producer, there are two principal sources of waste heat, one being the water jacket for cooling the exterior of the producer, and the other the sensible heat of the gas that is produced therein and which has ordinarily been dissipated as an incident to the washing of the gas. In a coke oven, the principal sources of waste heat are the sensible heat of the coke as it emerges from the oven and which heat is radiated by the lower portion of the battery and particularly the portion of the apparatus that receives the hot coke. The gas producer requires the consumption of a certain amount of its fuel for the production of sufficient heat for the generation of the gas produced thereby. It will be appreciated, therefore, that, if proper means be provided, the waste heat of the one apparatus may supply at least a portion of the heat required by the other.

In accordance with the present invention, I arrange that a coke-oven battery and a gas producer that is adjacent thereto may be so connected that an interchange of heat may occur between them. In general, the waste heat of the producer is utilized to generate steam that is used both for cooling the lower portions of the coke ovens and for quenching the coke as it emerges from the ovens. The steam that is used directly for cooling is preheated for use in the gas producer, with a resultant saving in fuel for the latter. The cooling of portions of the coke ovens operates indirectly to partially quench the coke before it leaves the ovens. The steam used directly for quenching the coke results in an increase in the amount of gas generated in the oven without greatly diminishing the quantity or quality of the coke.

Reference may now be had to the accompanying drawings, in which

Figure 1:
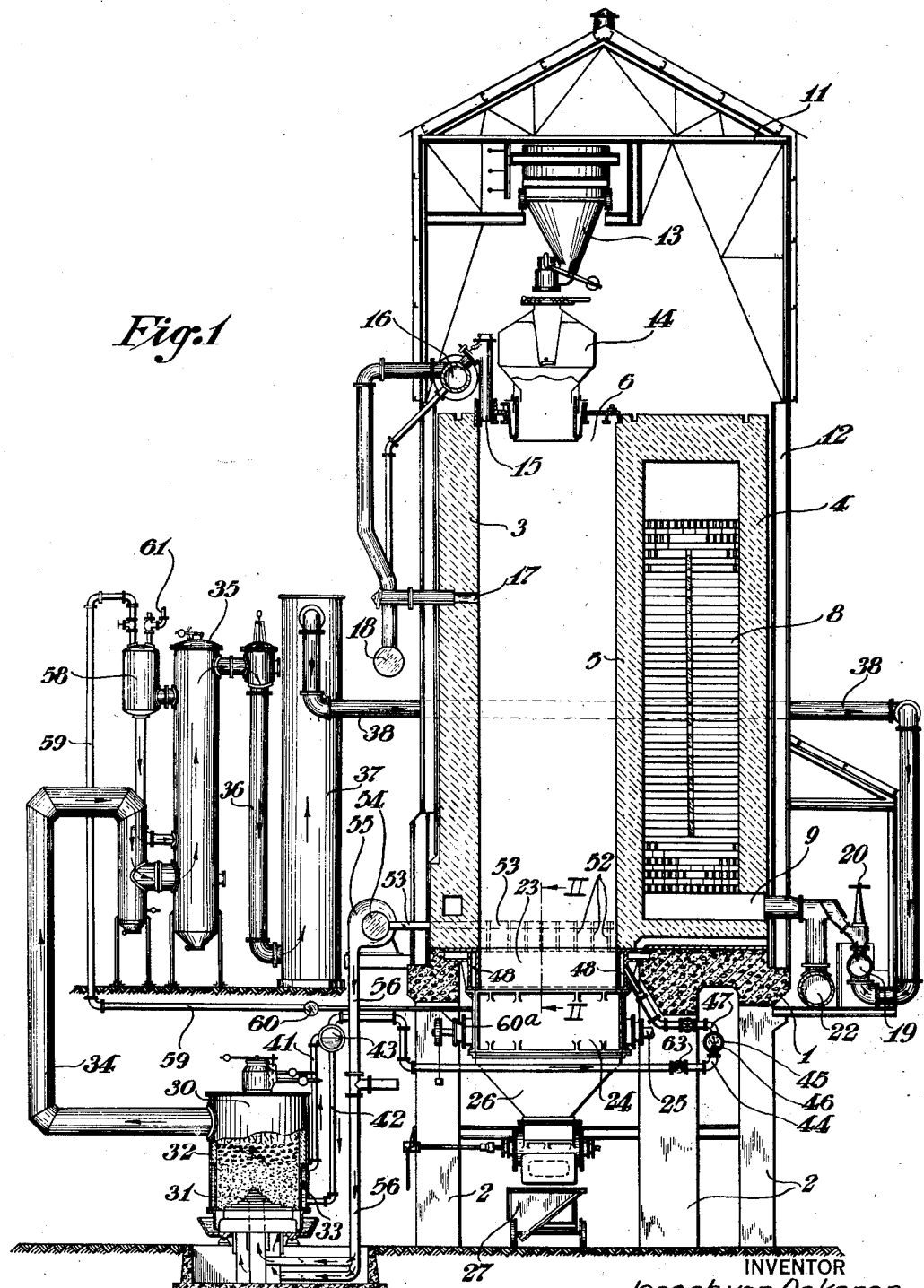
Figure 1 is a view, partially in vertical section and partially in elevation, of a vertical coke oven battery of the continuous type, a gas producer and associated apparatus, the connecting means being partially diagrammatically shown.

Referring particularly to Fig. 1, a battery of vertical coking retort ovens of the continuous type comprises a foundation 1, of concrete or other suitable material, that is supported on columns 2 and an oven structure comprising outer walls 3 and 4 and an inner wall 5. Extending between the walls 3 and 5 are a number of vertical coking retorts 6, through one of which the sectional view is taken. Also between the walls 3 and 5 are the heating walls 7, which alternate with the retorts 6. Regenerators 8, that are provided with sole channels 9, are located between the walls 4 and 5 and in horizontal extension of the heating walls 7.

A superstructure 11, that is supported by a framework 12, provides a support for a charging car 13 that supplies coal magazines 14, located above the tops of the several retorts. A primary gas offtake 15 is located at the top of each retort of the battery and is connected to a primary collecting main 16. A secondary gas offtake 17, that is located below the top of each of the retorts for the purpose of discharging the gas that is evolved at a lower level, is connected to a secondary collecting main 18. Producer gas is supplied to the ovens through the sole channels 9 from a gas main 19 that is provided with regulating valves 20. A main 22 conducts waste gases to the stack.

Beneath the battery and anchored in the foundation 1 are hollow supporting frames 23 of metal that respectively surround the lower opening of each of the retorts. Secured to each supporting frame 23 is a hollow casing 24, within which is located a power-driven coke extractor that is driven by means of a shaft 25. Below the coke extractor is a coke magazine 26 that is provided with suitable means for discharging the coke into a coke-receiving car 27.

A gas producer 30, which may be located closely adjacent to the coke oven battery, may be of the usual type that is provided with an eccentric rotating grate 31 and a stationary shell 32 having a water jacket 33. The gas producer is provided with a gas outlet pipe 34, that is connected to a waste heat steam boiler 35. The producer gas, after passing through the waste heat steam boiler, enters a pipe 36 that is connected to a gas cooler 37 of any suitable type that is, in turn, connected by a pipe-line 38 to the gas main 19.

Figure 3:
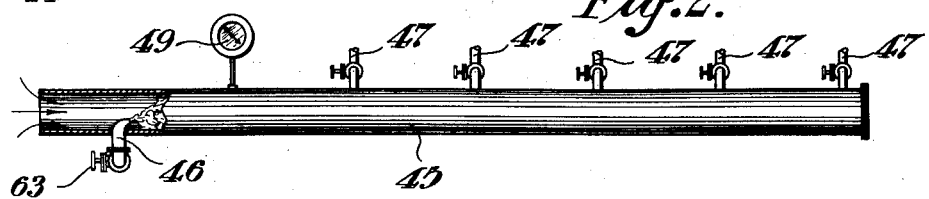
Fig. 3 is a view, partially in elevation and partially in section, of a header member forming a part of the cooling system of the battery.

The water jacket 33 of the gas producer is connected, by means of pipes 41 and 42, to a header 43, from which steam is piped by means of a pipe line 44 to a header 45, the details of which are illustrated in Fig. 3. The steam enters the header 45 through a nozzle 46 adjacent to one end of the header that is open to the atmosphere. The nozzle 46 is directed inwardly and the open end of the header permits the entrance of air for mixture with the steam to form a cooling mixture. The header 45 is provided with branch outlet pipes 47, corresponding in number to the retorts of the battery and which are respectively connected to the passageways 48 of the hollow supporting members 23 of the several ovens. The header is also provided with a thermometer 49.

Figure 2:
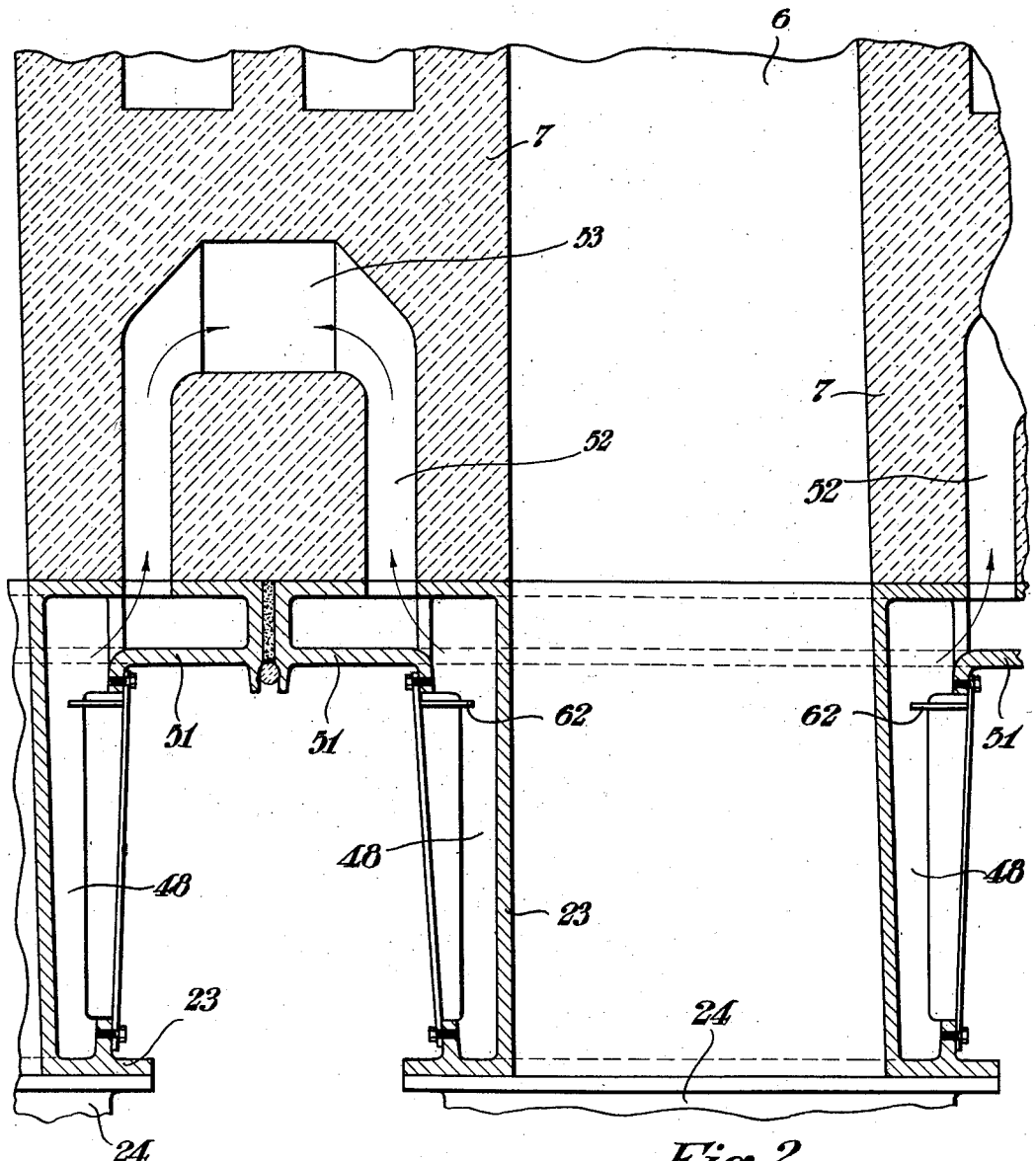
Fig. 2 is an enlarged view, in vertical section taken on line II—II of Fig. 1, of a portion of the coke-oven battery.

As best shown in Fig. 2, the supporting frames 23 are provided on each side thereof with hollow projecting flange portions 51 that are connected to the hollow side portions of the members 23 and also to a series of vertical ducts 52 in the lower portion of the adjacent heating walls 7. Certain of the vertical ducts 52 are shown in dotted lines in Fig. 1. Each wall 7 has a horizontal duct 53 that is connected to both series of vertical ducts 52 in the wall.

The horizontal ducts 53 from the several heating walls are connected to a header 54 from which the cooling fluids are drawn by a blower 55, or other suitable power device, and supplied by means of a pipe 56 to the inlet of the gas producer 30.

The waste heat steam boiler 35 is provided with a steam trap 58, from which steam flows by means of a pipe line 59 and a header 60 for distribution to each of the gas-tight casings 24, for the purpose of quenching the coke received therein. The distributing means comprises a series of spaced pipes 60a that are connected to the header 60 in substantially the same manner that the pipes 47 are connected to the header 45, Fig. 3, only one of the pipes 60a and the corresponding casing 24 appearing in Fig. 1. A second pipe 61, connected to the steam trap 58, provides an outlet for any steam generated in excess of the requirements for coke quenching and which may be utilized for any desired useful work elsewhere.

It may be assumed that the coke oven battery and the gas producer 30 are in operation. Gas produced by the gas producer 30 passes through the pipe line 34 to the waste heat steam generator 35 and through the pipe 36 into the cooler 37, where the gas is cleaned and cooled in the usual manner. The gas then passes through the pipe line 38 into the main 19, from which it is supplied through the valves 20 and sole channels 9 to the regenerators 8 of the heating walls in which fuel is burned.

The coke oven battery, which is of the continuous type, is supplied with coal through the charging car 13 and the magazines 14, which is gradually coked and emerges from the several retorts 6 through the supporting member 23 and to the casing 24. The hot coke is quenched in the gas-tight casing 24 by the application of steam thereto that is supplied from the header 60 that is connected to the waste heat steam generator.

The steam, upon contact with the hot coke, decomposes and unites with a portion of the carbonaceous material to form water gas, which passes upwardly through the charge of coke and is discharged at the secondary offtake 17. Accordingly, the steam that is employed in the manner just described not only serves to quench the coke, which is a necessary operation, but to increase the quantity of gas normally produced by the oven. The coke then passes through the coke extractor connected to the shaft 25 and is stored in the magazine 26.

It will be appreciated that considerable heat is ordinarily radiated from the lower portion of the coke oven battery and particularly the supporting members 23 and the coke-handling apparatus associated therewith by reason of the high temperature of the coke as it emerges from the refractory material of the battery. The radiation of the heat beneath the battery constitutes a waste and, in addition, renders conditions very disagreeable for the operators because of the high temperatures that must be undergone.

The cooling system that I have provided operates not only to prevent a considerable portion of the radiation referred to above but to reduce the temperature of the coke at the bottom of the ovens, and, in addition, to conserve a considerable portion of the heat. Steam from the water jacket 33 of the gas producer 30 is collected in the header 43 from which it is supplied through the pipe 44 and nozzle 46 to the header 45. As previously stated, the blower 55 is connected to the header 54, which is, in turn, connected to the cooling systems of the several retorts.

The suction of the blower 55 causes steam supplied by the nozzle 46 and air from the open end of the header 45 to be drawn through the branch pipes 47, the hollow passageways 48, vertical ducts 52 and horizontal ducts 53 to the header 54, from which it is forced into the inlet of the gas producer through the pipe 56. The distribution of the currents of air and steam through the passageways 48 may be determined by suitable baffles 62.

The mixture of air and steam is regulated to the desired proportions by adjustment of a valve 63 in the pipe line 44 and the thermometer 49 provides an indication of the temperature of the mixture, which, for most efficient operation of the producer, should consist of air saturated with steam at approximately 55° C. The cooling mixture is preheated, for example, by approximately 550° F. The preheated cooling mixture is supplied to the inlet of the gas producer 30 and gas is produced therefrom with a resultant economy of fuel by reason of the preheating of the air and steam supply.

The preheating of the air and steam mixture increases the endothermic reactions, such as those of steam, incandescent carbon and oxygen. With equal amounts of fuel, there is a greater volume of combustible gases that are richer than those obtained with a cold blast. It has been calculated that the available heat of combustion in gas formed with the preheated blast per unit weight of coke as fuel is 12,300 B. t. u., as compared with 11,580 B. t. u. when a cold blast is used, and such difference indicates a saving in fuel of approximately 6.1%.

The cooling of the lower portion of each retort is important as the effect thereof is to partially quench the coke before it emerges into the metal casting or supporting frame. The casting would be damaged if the coke were not so treated. This method of cooling and indirectly quenching the coke, together with the use of steam to form water gas, renders it unnecessary to inject water for quenching.

Inasmuch as the coke oven battery and the gas producer are commonly closely adjacent in practice, the cost of interconnecting them for an interchange of waste heat in the manner set forth above is very small in view of the relatively large saving that may be effected, both in the increased production of gas in the coke ovens and the saving in fuel for the producer. These savings are effected by the utilization of waste heat that would otherwise not only be a complete loss but that, in the case of the coke oven, would add to operating disadvantages.

While I have shown and described the use of steam from the water jacket for the purpose of cooling the coke oven and the employment of steam from the waste heat steam generator for the purpose of quenching coke, it will be understood that such use is illustrative only and that the sources of steam might be interchanged without materially affecting the results to be obtained thereby. While I have shown and described one specific source of heat to be supplied to the gas producer, it is possible that modifications would occur to those skilled in the art relating to the coke ovens. My invention, therefore, is not to be limited to the specific arrangement shown, except as expressed in the claims.

I claim as my invention:

1. The combination with a continuous coke oven and a source of steam comprising a gas producer, of means for circulating steam from said source through a portion of the walls adjacent the outlet portion for solid residue of said oven to cool said wall portions and thereby reduce the temperature of coke adjacent thereto, and means for supplying the steam thus circulated to an inlet for said producer.

2. The combination with a continuous coke oven having passageways therein adjacent the outlet portion thereof for solid residue and a source of steam comprising a gas producer, of means for supplying steam from said source to the passageways of said coke oven for cooling adjacent portions of said oven and for returning the steam thus preheated to the producer for utilizaton in forming gas therein.

3. The combination with a continuous vertical coke oven having passageways in the walls adjacent the outlet portion for solid residue thereof and having an enclosing casing for receiving the column of coke as it emerges from said oven, of means comprising a gas producer for supplying gas for heating said oven and for supplying steam to said passageways to cool the walls and thereby quench said coke before it enters said casing, and means for returning the steam thus supplied to the producer for utilization therein.

4. The combination with a continuous coke oven and a gas producer having means for generating steam, of means for circulating steam generated by heat from said producer through a portion of said coke oven adjacent the outlet thereof for coke to cool the latter and for returning said steam to an inlet for said producer.

5. The combination with a continuous coke oven and a gas producer having a shell for cooling water, of means for cooling a portion of said oven adjacent the outlet thereof for solid residue with steam from within said shell and for supplying the steam thus used for cooling to the inlet of said producer.

6. The combination with a continuous coke oven and a gas producer having a jacket for cooling water, of means for cooling a portion of said oven adjacent the outlet thereof for solid residue with steam from within said jacket and with air and for supplying the steam and air to said producer.

7. The combination with a continuous coke oven having cooling passageways near the outlet portion for solid residue of said oven, of means comprising a gas producer for producing steam, and means for circulating air and steam produced by heat from said producer through said passageways to absorb heat and thereby cool said oven and for supplying the air and steam thus heated to said producer.

8. The combination with a continuous coke oven having cooling passageways near the outlet portion for solid residue of said oven, of means comprising a gas producer for producing steam, and means for circulating air and steam produced by heat from said producer through said passageways to absorb heat and thereby cool said oven and for supplying the air and steam thus heated to said producer, and means for regulating the proportions of steam and air.

9. The combination with a battery of continuous vertical coking retort ovens, each of which is provided with cooling passageways adjacent the outlet of the oven for solid residue thereof and a gas producer having a jacket for cooling water and adapted for generating steam therein, of means for connecting said water jacket to the passageways of each of said ovens and means for circulating steam from said jacket and air through said passageways and for collecting the cooling steam and air from said ovens and supplying it to said producer.

10. The combination with a battery of continuous vertical coking retort ovens, each of which is provided with cooling passageways adjacent the outlet of the oven for solid residue thereof and a gas producer having a jacket for cooling water and adapted for generating steam therein, of means comprising a header having an open end, for connecting said jacket to the passageways of each of said ovens and a power device for drawing steam from said header and air through the open end of said header for circulation through said passageways and for supplying the cooling steam and air thus circulated to said producer for the production of gas.

11. The combination with a continuous vertical coke oven having a supporting member adjacent the outlet for finished coke and provided with hollow portions and having also passageways through its walls and connected to said hollow portions, of a gas producer having means associated therewith for generating steam by heat from said producer and means comprising a power device for circulating a mixture of steam from said producer and air through said hollow portions and said passageways to absorb heat and for supplying the steam and air thus heated to said producer for the production of gas.

12. The combination with a continuous coke oven and means for generating steam and comprising a gas producer, of means for utilizing steam generated by heat from said producer to quench coke from said coke oven and to cool a portion of said coke oven structure adjacent a coke outlet, and means for supplying the steam thus used for cooling a portion of said coke oven structure together with air to said producer.

13. The combination with a continuous vertical coking retort oven and a gas producer having a jacket for cooling water, of a waste heat steam boiler adapted to be heated by the gas from said producer, means for connecting said boiler to said oven for quenching coke with steam from said boiler and means for cooling a coke outlet portion of the structure of said oven with steam from within said jacket and for supplying the steam used for cooling to said producer.

14. The combination with a continuous vertical coking retort oven and a gas producer for supplying gas for heating said oven and having a shell for cooling water, of means for supplying steam from said shell to a portion of the structure of said oven for cooling the latter and for returning said steam to the gas producer for utilization therein in the production of gas.

In testimony whereof, I have hereunto subscribed my name this 30th day of December, 1926.

JOSEPH VAN ACKEREN.